_United States Patent Office_

3,734,942
Patented May 22, 1973

3,734,942
PREPARATION OF NITRILES
William E. Dennis, Midland, Mich., assignor to Dow
Corning Corporation, Midland, Mich.
No Drawing. Filed Mar. 26, 1970, Ser. No. 23,025
Int. Cl. C07c *121/02*
U.S. Cl. 260—465 B          4 Claims

ABSTRACT OF THE DISCLOSURE

Nitriles are prepared by reacting amides or aldoximes with cyclic diorganosilazanes. For example, benzamide was reacted with hexa-methylcyclotrisilazane at 130° C. to give a 94% yield of benzonitrile.

---

The dehydration of amides and aldoximes is known and has been previously carried out with strongly acidic materials such as phosphorous pentoxide, phosphorous oxychloride or zinc chloride; or strongly basic materials such as sodium borohydride or lithium aluminum hydride. These materials give strongly basic or acid by-products which often interfere with the reaction, particularly where the amide or aldoxime also contain groups affected by strong acid or base.

Klebe J.A.C.S. (90), 5246, July-Sept. 1968, shows that chlorosilanes react with amides to give N silyl-substituted amides which decompose on heating to give nitriles. However, the reaction of the halosilanes with amides produces a strong acid by-product.

The present method offers the following advantages:
(1) High yields of nitriles.
(2) Good volume efficiency due to in part to the low equivalent weight of the silazane.
(3) Volatile weak basic by-products ($NH_3$ or amines) and a non-volatile inert by-product (siloxane) from which the nitrile product can be separated by distillation or filtration.
(4) The process can be used with amides or aldoximes containing acid-sensitive groups such as acetals or ketals without destroying them.

This invention relates to a method comprising reacting an amide or an aldoxime with a cyclic silazane of the formula $(R_2SiNR')_x$ in which R is a monovalent hydrocarbon radical of 1 to 7 carbon atoms and R' is hydrogen or a monovalent hydrocarbon radical of 1 to 7 carbon atoms, at a temperature sufficient to convert the amide or aldoxime to the corresponding nitrile, said amide and aldoxime being of the formula R"{CONR'''$_2$}$_b$ and R"{CH=NOH}$_b$ respectively, in which R" is an organic radical of valence b and is a hydrocarbon radical or a substituted hydrocarbon radical in which the substituent groups are selected from the group consisting of halogen atoms having a reactivity to base not greater than allylic halogens, hydroxyl, carboxyl, carboxyester, carbonate, ether {COC}, acetal, ketal, nitro, amino, carbamate, ketoxime, mercapto, sulfide, disulfide, sulfonamide, nitrile, thiocarboxyl, dithiocarboxyl, sulfone, sulfoxide, phosphine oxide, azol, thiazol, oxazol and azine, b has a value from 1 to 4 and R''' is hydrogen or a monovalent hydrocarbon radical of from 1 to 7 carbon atoms except that when R' is hydrocarbon both R''''s are hydrogen.

The reactions of this invention can be carried out by heating the amide and the ketoxime with the silazane at temperature ranging from 80° to 300° C. Obviously, the temperature selected should be below that which will decompose the starting materials or the desired product. The particular temperature which is best for any particular reaction varies with the ketoxime or amide employed and with the silazane used. Pressure is not critical and the reaction can be run at atmospheric or subatmospheric pressure.

If desired, solvents can be used which are inert such as hydrocarbon solvents such as toluene, xylene, high boiling petroleum ethers and the like.

The products of this invention can be represented by the formula R"(C≡N)$_b$ in which R" and b are as above defined. The reactions of this invention can be represented as follows:

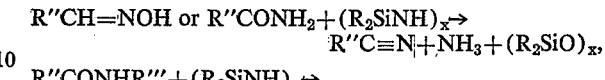
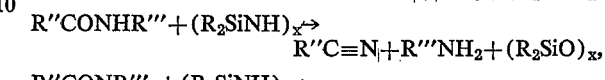
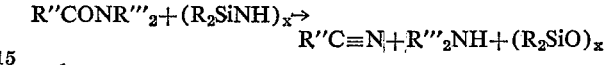

and

The amides and aldoximes operative herein include those in which R" is any hydrocarbon radical. Examples of such radicals are any aliphatic hydrocarbon radical such as alkyl radicals such as methyl, ethyl, isopropyl, t-butyl, octadecyl, octacosyl, dotriacontyl, 4-ethyl-3,3-dimethylhept - 1 - yl and 2-methyl-5,5-bis-1',1'-dimethylpropyldec-1-yl; alkenyl radicals such as vinyl, allyl, methallyl, butadienyl, and 5,5-dimethyl-1-hexenyl; alkynyl hydrocarbon radicals such as ethynyl, propynyl, or 5-ethynyl-1,3,6-heptatrien-3-yl and 1,4-hexadiynenyl, cycloaliphatic hydrocarbon radicals such as cyclohexyl, cyclopentyl, cyclohenyl, cyclohexadienyl, perhydroanthracyl, perhydrocyclopenta{a}phenanthryl, camphenyl, 3-pinayl, 5-norbornene-2-yl, 1-p-menthenyl, 2-carenyl, methylcyclohexyl, 1,1':3',1'' - tercyclohexyl and bicyclo{4.3.2}undecanyl; aromatic hydrocarbon radicals such as phenyl, tolyl, xylyl, xenyl, naphthyl, anthracyl, phenanthryl, fluoryl, pentacyl, hexacyl, rubicyl, coronyl, pyryl, heptaphyl, ovalyl and tetraphenylyl; mixed aromaticalicyclic ring hydrocarbon radicals such as 1,2-cyclopentenophenanthryl, aceanthryl, indyl, 1,4-dihydronaphthyl, 1,2,3,4-tetrahydronaphthyl, 15H cyclopenta{a}phenanthryl, 4-phenylcyclohexyl and 2H-indene-2-spiro - 1 - cyclopent-4'-yl; araliphatic hydrocarbon radicals such as benzyl, β-phenylpropyl, styryl, cinnamyl, diphenylmethyl, p-vinylstyryl, phenylethynyl; and aliphatic-alicyclic hydrocarbon radicals such as cyclohexylmethyl, β-cyclohexylethyl, β-cyclohexylpropyl, 10 cyclopentyldecyl, omega-cyclohexadienyloctadecyl and β-cyclohexyl ethynyl.

It is to be understood that the above specific structures can have 1, 2, 3, or 4 amide and/or aldoxime groups substituted thereon. Thus, the hydrocarbon radicals can be monovalent, divalent, trivalent or tetravalent with respect to the amide or aldoxime groups. For example, one can employ $H_2NOC(CH_2)_3CONH_2$, $HON=CH(CH_2)_3CONH_2$, $C_6H_4CONH_2$, $C_6H_3(CONH_2)_3$, $C_6H_2(CONH_2)_4$ or $HON=CH(CH_2)_3CH(CH_2CH=$
$NOH)—(CH_2)_2CH=NOH$.

In addition to the amide and aldoxime groups any of the structures shown for R" above can be substituted with any of the functional groups listed below. The term functional group not only includes substituent groups attached to R", but heteroatoms such as O, N or S built into R" in linear, branched or cyclic configurations. Thus, R" can be linear or branched radicals such as $HOOCCH_2$—,

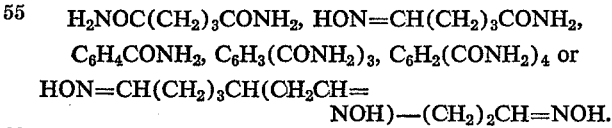

or cyclic radicals such as thienyl, benzo{b}thienyl, thianthrenyl, furyl, pyranyl, isobenzofuranyl, pheoxathienyl, pyrrolyl, imidazolyl, pyrazolyl, pyridyl, pyrimidinyl, isoindolyl, purinyl, acridinyl, permidinyl, phenothiazenyl, isoxazolyl, furazanyl, imidazolidinyl, imidazolinyl, piperidyl, morpholinyl, quinuclidinyl, thieno(2,3-b) furanyl, 2,4,6-trithia 3a,7a diazaperhydroindyl and 3,3-spirobi-(3H-indolyl) or combinations of linear and cyclic structures such as omega thienyl decyl.

The following definitions are used for the functional groups used herein:

| | | | |
|---|---|---|---|
| Hydroxyl | COH | Carboxy ester | C=OOC |
| Carboxyl | COOH | Carbonate | COC=OO—C |
| Amino | CNH$_2$ | Nitro | C—NO$_2$ |
| | H<br>|<br>CNC | Carbamate | CNHC=OOC |
| | C<br>|<br>CNC | Ketoxime | C<br>\<br>   C=NOH<br>/<br>C |
| Phosphine oxide | C<br>|<br>C—P(O)C | | |
| Sulfide | C—S—C | Mercapto | CSH |
| Disulfide | C—S—S—C | | |
| Ether | —C—O—C—ᵃ | | |
| Acetal | —CH(O—C)$_2$ | Sulfone | C SO$_2$ C |
| Ketal | —C(O—C)$_2$ | Nitrile | C C=N |
| Azol | C=NC | Sulfoxide | C SO C |
| Oxazol | CO—N=C | Thiocarboxyl | —C=SOH |
| Thiazol | C S N=C | di-Thiocarboxyl | —C=S SH |
| Azine | C—N=NC | | |

ᵃ Excludes 1,2 epoxy.

In addition to the above R'' can be substituted with any halogen which does not have a reactivity to base greater than allylic halogens. This term excludes such highly reactive halogens as acyl halides, sulfonyl halides, alpha-haloethers and beta-haloaldehydes. Examples of halogenated amides and aldoximes operative herein are trifluoroacetamide, bromo-benzamide, trichloroacetamide, iodobenzaldoxime, ClCH$_2$CH$_2$OCH$_2$CH$_2$CH=NOH, perfluoroheptaaldoxime, tetrachlorobenzamide, Cl(CH$_2$)$_3$S(CH$_2$)$_3$CONH$_2$, monofluoro-1,2-cyclopentenophenanthryl, monochlorothienyl, dichlorofuryl, trichloroxanthenyl, monofluoroisoindolyl, chlorothieno(2,3-b)furyl, chloro - 1,3 - dioxa-4-cyclohexyl and (ClCH$_2$CH$_2$CH$_2$)$_2$POCH$_2$CH$_2$—.

The amides and aldoximes used herein can have two or more of the above functional groups together one or more amide or aldoxime groups. It should be understood that hydroxyl and carboxyl groups may be silylated during the reaction by interaction with the silazane. However, the OH and COOH group can be easily regenerated after the amide or aldoxime groups have been converted to the C≡N group. This is done by hydrolyzating the silylated groups by mixing the compound with water. Also any acid groups present may form ammonium salts. These can be converted to the free acid by treatment with ion exchange resins.

The silazanes employed herein are dihydrocarbyl silazanes in which the substituents on the silicon atom are hydrocarbon radicals of 1 to 7 carbon atoms such as dimethylsilazane, vinylmethylsilazane, ethylmethylsilazane, diphenylsilazane, phenylmethylsilazane, tolylmethylsilazane, hexylmethylsilazane or dihexylsilazane. These silazanes are cyclic materials in which the number of silicon atoms range from 3 to 8 or more. The number of silicon atoms in the silazane is not critical. Such silazanes are well known in the art and their method of preparation is well known. Also the silazanes employed herein can be those which have a hydrocarbon radical substituted on the nitrogen. Thus, R' can be hydrogen or a monovalent hydrocarbon radical of from 1 to 7 carbon atoms such as methyl, ethyl, allyl, cyclohexyl, phenyl or isopropyl. This type of silazane can be made by reacting the corresponding diorgano-dichlorosilanes with primary amines. The methods for doing this are well known in the art.

When R' is a hydrocarbon radical it is necessary that both of the R''' groups in the amide to be hydrogen. Otherwise, the reaction will not proceed in accordance with this invention.

The following examples are illustrative only and should not be construed as limiting the invention which is properly delineated in the appended claims.

EXAMPLE 1

A mixture of 60 g. of benzamide and 100 g. of hexamethylcyclotrisilazane was heated at 84° to 110° C. for 30 hours and then for 130° C. for 18 hours. Distillation of the mixture gave a 94% yield of benzonitrile, boiling 70° to 73° C. at 10 mm.

EXAMPLE 2

A mixture of 12.1 g. of benzamide and 14 g. of octamethylcyclotetrasilazane was heated at 220° C. for 4.5 hours. The mixture was then distilled to give a 71% yield of benzonitrile boiling 87° to 88° C. at 27 mm.

EXAMPLE 3

A mixture of 13 g. of symmetrical benzaldoxime and 10 g. of hexamethylcyclotrisilazane was heated at 110° C. for 6 hours. The mixture was distilled to give a 72% yield of benzonitrile.

EXAMPLE 4

A mixture of 16 g. of N(p-methylphenyl)diphenylacetamide and 11 g. of hexamethylcyclotrisilazane was heated at 240° C. for 4 hours. The product was taken up in benzene and hexane and then the solvents were removed in vacuum to obtain a 73% yield of diphenylacetonitrile, melting 69° to 70° C.

EXAMPLE 5

A mixture of 6.75 g. of N-methylbenzamide and 11 g. of hexylmethylcyclotrisilazane was heated at 220° to 240° C. for 48 hours and then slowly distilled over the next 16 hours to give a 42% yield of benzonitrile.

EXAMPLE 6

A mixture of 14.9 g. of N-methylacetanilide and 7.5 g. of hexamethylcyclotrisilazane was heated at 240° to 260° C. for 64 hours. The product was distilled to give acetonitrile in about 50% yield.

EXAMPLE 7

A mixture of 30 g. of acetamide and 100 g. of hexamethylcyclotrisilazane was heated at 120° to 130° C. for 64 hours and to 170° C. for an additional 24 hours. The product was distilled to give acetonitrile in 85% yield boiling at 80° C.

EXAMPLE 8

12.1 g. of benzamide and 9 g. of nona-methylcyclotrisilazane, (Me$_2$SiNMe)$_3$ were heated together at 125° C. in order to melt the reactants. The mixture was then heated at 150° C. for 19 hours. The product benzonitrile was produced in 72.8% yield.

EXAMPLE 9

Acetonitrile is obtained when acetamide is heated with the following silazanes at 130° C. for 64 hours. Hexahexylcyclotrisilazane, symmetrical triphenyltrimethylcyclotrisilazane, hexaethylcyclotrisilazane, symmetrical trivinyltrimethylcyclotrisilazane, decamethylcyclo(N-ethyl)pentasilazane and hexadecamethylcyclooctasilazane.

EXAMPLE 10

In this example Me is methyl and Et is ethyl. The following nitriles are obtained when the following amides and aldoximes are reacted with hexamethylcyclotrisilazane at 150° C.

| Amide | Aldoxime | Product |
|---|---|---|
| MeOOC(CH₂)₃CONH₂ | | MeOOC(CH₂)₃C≡N |
| | MeO(CH₂CH₂O)₅CH₂CH₂CH=NOH | MeO(CH₂CH₂O)₅CH₂CH₂C≡N |
| H₂NOCC₆H₄CONH₂ | | N≡CC₆H₄C≡N |
| EtOC=OOCH₂CH₂CONH₂ | | EtOC=OOCH₂CH₂C≡N |
| | CH₂=CHCH₂CH=NOH | CH₂=CHCH₂C≡N |
| | ClCH₂CH₂CH₂CH₂CH=NOH | ClCH₂CH₂CH₂CH₂C≡N |
| (MeO)₂CH(CH₂)₃CONH₂ | | (MeO)₂CH(CH₂)₃C≡N |
| | ClCH₂CH=CHCH₂CH=NOH | ClCH₂CH=CHCH₂C≡N |
| | HOCH₂CH₂CH=NOH | HOCH₂CH₂C≡Nᵃ |
| HC≡CCH₂CONH₂ | | HC≡CCH₂C≡N |
| | N≡CCH₂CH₂CH=NOH | N≡CCH₂CH₂C≡N |
| HS⟨S⟩CONH₂ | | HS⟨S⟩C≡N |
| HSOCCH₂CH₂CNOH₂ | | HSOCCH₂CH₂C≡N |
| HOOCCH₂C₆H₄CONH₂ | | HOOCCH₂—C₆H₄C≡N |
| (EtO)₂CCH₂CH₂CH₂CONH₂<br>       \|<br>      Me | | (EtO)₂CCH₂CH₂CH₂C≡N<br>       \|<br>      Me |
| O₂NC₆H₄C₆H₄CONH₂ | | O₂NC₆H₄C₆H₄C≡N |
| HON=C(Me)CH₂CH₂CONH₂ | | HON=C(Me)CH₂CH₂C≡N |
| [tetracyclic structure with S,S,S,S rings, H₂N and CONH₂ groups] | | [tetracyclic structure with S,S,S,S rings, H₂N and C≡N groups] |
| MeOC₆H₄CONH₂ | | MeOC₆H₄C≡N |
| | EtOOC(CH₂)₄CH=NOH | EtOOC(CH₂)₄C≡N |
| MeSCH₂CH₂CONH₂ | | MeSCH₂CH₂C≡N |
| Et₂PO(CH₂)₃CONH₂ | | Et₂PO(CH₂)₃C≡N |
| H₂NSO₂CH₂CH₂CH₂CONH₂ | | H₂NSO₂CH₂CH₂CH₂C≡N |
| | HOOCCH₂CH₂CH=NOH | HOOCCH₂CH₂C≡N |
| [pyrrole NH]—CH₂C₂CH₂CONH₂ | | [pyrrole NH]—CH₂CH₂CH₂C≡N |
| EtOO=CNHCH₂CH₂CH₂CONH₂ | | EtOO=CNHCH₂CH₂CH₂C≡N |
| MeSO₂C₆H₄CONH₂ | | MeSO₂C₆H₄C≡N |
| MeSOC₆H₄CON₂ | | MeSOC₆H₄C≡N |
| EtSS(CH₂)₃CONH₂ | | EtSS(CH₂)₃C≡N |
| (EtO₂S)C(CH₂)₃CONH₂<br>    ₂\|<br>    Me | | (EtO₂S)₂C(CH₂)₃C≡N<br>       \|<br>      Me |
| CF₃CONH₂ | | CF₃C≡N |
| BrC₆H₄CONH₂ | | BrC₆H₄C≡N |
| C₆H₂(CONH₂)₄ | | C₆H₂(C≡N)₄ |
| | HON=CH(CH₂)₄CH=NOH | N≡C(CH₂)₄C≡N |
| [pyrrole H-N]—CH₂CONH₂ | | [pyrrole H-N]—CH₂C≡N |
| [imidazole H-N]—(CH₂)₅CONH₂ | | [imidazole H-N]—(CH₂)₅C≡N |
| [pyridine]—(CH₂)₅CONH₂ | | [pyridine]—(CH₂)₅C≡N |
| | [isoxazole]—(CH₂)₃CH=NOH | [isoxazole]—(CH₂)₃C≡N |
| | [thiazole]—CH₂CH=NOH | [thiazole]—CH₂C≡N |

TABLE—Continued

| Amide | Aldoxime | Product |
|---|---|---|
|  | | 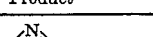 |
|  | |  |

* After hydrolysis of the Me₂SiOCH₂CH₂—group.

That which is claimed is:

1. A method comprising reacting an amide or an aldoxime with a cyclicsilazane of the formula $(R_2SiNR')_x$ in which $x$ is an integer from 3 to 8, R is a monovalent hydrocarbon radical of 1 to 7 carbon atoms and R' is hydrogen or a monovalent hydrocarbon radical of 1 to 7 carbon atoms, at a temperature of from 80 to 350° C. and sufficient to convert the amide or aldoxime to the corresponding nitrile, said amide or aldoxime being of the formula $R''\{CONR'''_2\}_b$ or $R''\{CH=NOH\}_b$ in which R'' is an organic radical of valence $b$ and is selected from the group consisting of hydrocarbon radicals or substituted hydrocarbon radicals in which the substituent groups are selected from the group consisting of halogen atoms having a reactivity to base not greater than allylic halogens, hydroxyl, carboxyl, carboxyester, carbonate, ether{COC}, acetal, ketal, nitro, amino, carbamate, ketoxime, mercapto, sulfide, disulfide, nitrile, sulfonamide, thiocarboxyl, dithiocarboxyl, sulfone, sulfoxide, phosphine oxide, azol, thiazol, oxazol and azine, R'' containing from 1 to 32 carbon atoms, $b$ has a value of from 1 to 4, and R''' is hydrogen or a monovalent hydrocarbon radical of from 1 to 7 carbon atoms except that when R' is hydrocarbon both R''''s are hydrogen.

2. The method of claim 1 in which both R's are methyl and R' is hydrogen.

3. A method comprising reacting an amide or an aldoxime with a cyclic silazane of the formula $(R_2SiNR')_x$ in which $x$ is an integer from 3 to 8, R is a monovalent hydrocarbon radical of 1 to 7 carbon atoms, R' is hydrogen or a monovalent hydrocarbon radical of 1 to 7 carbon atoms, at a temperature of 80 to 350° C. and sufficient to convert the amide or aldoxime to the corresponding nitrile, said amide or aldoxime being of the formula $R''\{CONR'''_2\}_b$ or $R''\{CH=NOH\}_b$ in which R'' is a hydrocarbon radical of valence $b$, having from 1 to 32 carbon atoms, $b$ has a value from 1 to 4 and R''' is hydrogen or a monovalent hydrocarbon radical of from 1 to 7 carbon atoms, except that when R' is hydrocarbon both R''''s are hydrogen.

4. The method of claim 3 in which R'' is phenyl and $b$ is 1.

References Cited

UNITED STATES PATENTS 2,455,651   12/1948   Bostnick _____ 260—465 X

OTHER REFERENCES

Klebe: J. Amer. Chem. Soc., vol. 90, pp. 5246–51 (1968).

LEWIS GOTTS, Primary Examiner

D. H. TORRENCE, Assistant Examiner

U.S. Cl. X.R.

260—247, 251 R, 252, 279 R, 293.51, 293.53, 294.9, 302 R, 304, 307 H, 307 R, 309, 309.6, 309.7, 326.1, 326.62, 327 R, 329 R, 330.5, 345.1, 346.1 R, 346.2, 448.2 N, 463, 455, 464, 465 A, 465 D, 465 E, 465 F, 465 G, 465 H, 465.1, 465.2, 465.4, 465.5, 465.6, 465.7, 465.8, 465.9